(12) United States Patent
Storm et al.

(10) Patent No.: US 8,841,595 B2
(45) Date of Patent: Sep. 23, 2014

(54) IMAGE SENSOR WITH SAMPLE AND HOLD CIRCUITRY FOR ADDRESSING TIME VARIANT NOISE

(75) Inventors: Graeme Storm, Forres (GB); Matthew Purcell, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 506 days.

(21) Appl. No.: 13/173,137

(22) Filed: Jun. 30, 2011

(65) Prior Publication Data

US 2012/0006973 A1  Jan. 12, 2012

(30) Foreign Application Priority Data

Jul. 6, 2010 (GB) .................................. 1011385.0

(51) Int. Cl.
*H01L 27/00* (2006.01)
*H04N 5/378* (2011.01)
*H04N 5/363* (2011.01)
*H04N 5/365* (2011.01)
*H04N 5/357* (2011.01)

(52) U.S. Cl.
CPC ............... *H04N 5/363* (2013.01); *H04N 5/378* (2013.01); *H04N 5/3658* (2013.01); *H04N 5/3575* (2013.01)
USPC .............. 250/208.1; 250/214.1; 250/214 DC; 348/281; 348/307

(58) Field of Classification Search
USPC ......... 250/206, 214.1, 214 R, 214 DC, 208.1; 348/272, 281, 294, 295, 297, 307, 312, 348/313; 341/155
See application file for complete search history.

(56) References Cited

U.S. PATENT DOCUMENTS

| | | | |
|---|---|---|---|
| 7,969,476 B1 * | 6/2011 | Koifman | 348/222.1 |
| 2003/0071748 A1 | 4/2003 | Huang et al. | |
| 2008/0084338 A1 * | 4/2008 | Tsai et al. | 341/120 |
| 2010/0157035 A1 * | 6/2010 | Purcell et al. | 348/65 |
| 2010/0315540 A1 * | 12/2010 | Hoshino | 348/294 |

OTHER PUBLICATIONS

UK Search Report for GB1011385.0 mailed Sep. 28, 2010 (1 page).

* cited by examiner

*Primary Examiner* — Francis M Legasse, Jr.
(74) *Attorney, Agent, or Firm* — Gardere Wynne Sewell LLP

(57) ABSTRACT

An image sensor includes an array of pixels. Each pixel has at least one photo-sensitive element. Readout circuitry receives an analog signal from each pixel at a first time and at a second time, between which the analog signal changes. The image sensor further includes associated support circuitry which is a source of time variant noise. The signal level at both first and second times includes pixel noise. Sample and hold circuitry is provided to maintain substantially level at least a proportion of this support circuitry noise time invariant at the sensor output between the first time and the second time.

20 Claims, 5 Drawing Sheets

IMAGE SENSOR WITH SAMPLE AND HOLD CIRCUITRY FOR ADDRESSING TIME VARIANT NOISE

PRIORITY CLAIM

This application claims priority from United Kingdom Application for Patent No. 1011385.0 filed Jul. 6, 2010, the disclosure of which is hereby incorporated by reference.

TECHNICAL FIELD

This invention relates to pixel array circuitry for use in image sensors, such as those for use in mobile applications such as cameras and mobile phones. The invention also relates to devices, such as mobile phones, digital cameras and optical mice (computer pointing devices) incorporating solid state image sensors.

BACKGROUND

Image sensors using pinned photodiode pixels, typically implemented in CMOS architecture, are well known. Such image sensors in many applications have the advantage that both the image sensitive element and the image processing circuitry can be embodied in a single chip which can be manufactured using CMOS techniques.

However there is an increasing need for image sensors with high quality output. One significant factor in sensor output quality is noise resultant from the sensor support circuitry. Such noise can affect the output level of each pixel differently, or in some cases can affect the output levels of all the pixels in a row or column equally. It is known that the latter case is more problematic as the human eye perceives such an output glitch to be much more evident than noise that differs on a pixel-to-pixel basis.

Consequently, there is a need in the art to address the above issues.

SUMMARY

In a first aspect of the invention there is provided an image sensor comprising: an array of pixels, each pixel having at least one photo-sensitive element, readout circuitry operable to receive an analog signal from each pixel at a first time and at a second time, the signal level between said first and second times varying significantly in dependence with the light sensed by said photo-sensitive element, said signal level at both first and second times comprising noise resultant from said pixel; and pixel array support circuitry, for performing at least one support operation necessary for the operation of said pixel array, said support circuitry being a source of time variant noise on the sensor output. There is further provided sample and hold circuitry operable to maintain substantially level at least a proportion of said support circuitry noise such that said proportion is substantially time invariant at the sensor output between said first time and said second time.

Said sample and hold circuitry may comprise a switch operable to disconnect the source of said at least a proportion of said support circuitry noise. In addition it may further comprise a sampling capacitor for said maintaining substantially level said at least a proportion of said support circuitry noise. Alternatively, said support circuit may comprise its own capacitance which may be used for said maintaining substantially level at least a proportion of said support circuitry noise. Said switch may be controlled so as to open at a time prior to said first sample time.

Said support circuit may be a regulator circuit for the provision of voltage control signal voltages. Where said regulator comprises two or more stages, said switch may be located prior to the output stage Said support circuit may be a current source circuit for the provision of a bias current. Where said current source circuit comprises a current reference and two transistors arranged as a current mirror, said switch may be located between the current reference output and the control electrodes of the two transistors.

Said support circuit may be a power supply circuit for said image sensor.

Said support circuitry may be a bandgap circuit. Said bandgap circuit may be operable to provide reference voltages, with sample and hold circuitry being located at the output of said bandgap circuit. Alternatively, or in addition said bandgap circuit may be operable to provide bias currents, with sample and hold circuitry being located within said bandgap circuit.

There may be provided a plurality of sample and hold circuits, each for a different support circuit.

The readout circuit may use a continuous time architecture comprising: an input circuit comprising a first input for receiving said analog signal and a second input for receiving a time variant reference signal, and two coupling capacitors; and a comparator circuit that compares the time variant reference signal and the analog signal; wherein the analog signal from the pixel and the time variant reference signal are constantly read onto one of the two coupling capacitors respectively of the input circuit between said first time and said second time;

In such a case, the sensor may be operable such that the threshold of said comparator circuit is dependent on the analog signal at said first time, said readout circuit being operable, at said second time, to perform an analog to digital conversion to obtain a digital value corresponding to the change in said analog signal level between said first time and said second time.

In a further aspect there is provided a method of minimizing output noise of an image sensor, said image sensor having an array of pixels, each pixel having at least one photo-sensitive element and support circuitry for performing a support operation necessary for the operation of said image sensor, said support circuitry being a source of time variant noise on the sensor output, said method comprising the steps of: sampling and holding level at least a first noise signal within or at the output of said support circuitry at a first time; receiving, at a readout circuit, an analog signal from each pixel of said image sensor at a second time, connecting, for a transfer period, said photo-sensitive element to the pixel output such that said analog signal varies in dependence with the amount of light sensed by said photo-sensitive element during a prior integration period; receiving, at said readout circuit, said analog signal from each pixel of said image sensor at a third time subsequent to said transfer period; and performing an analog to digital conversion to obtain a digital value corresponding to the change in said analog signal level between said second and third times, the noise contributions from said pixel and said first noise signal being substantially time invariant between said second and third times.

Said support circuit may be a regulator circuit for the provision of voltage control signal voltages comprising two or more stages, said sample and hold of the first noise level being performed prior to the output stage.

Said support circuit may be a current source circuit for the provision of a bias current comprising a current reference and two transistors arranged as a current mirror, said sample and hold of the first noise level being performed between the current reference output and the control electrodes of the two transistors.

Said support circuit may be a power supply circuit for said image sensor, said sample and hold of the first noise level being performed while still providing a current path for said power supply to provide sufficient current as is necessary.

Said support circuit may be an analog to digital conversion circuit for said conversion of the analog signals output from said pixels, said sample and hold of the first noise level being performed at the output of the amplifier comprised in said analog to digital conversion circuit.

Said method may further comprise receiving said analog signal at a first input and receiving a time variant reference signal at a second input; and comparing the time variant reference signal and the analog signal; wherein the analog signal from the pixel and the time variant reference signal are constantly read onto one of the coupling capacitors respectively between said first time and said second time.

In such a case, the threshold of said comparator circuit may be dependent on the analog signal at said first time, said readout circuit, at said second time, performing said analog to digital conversion.

Other aspects of the invention include camera modules, cameras mobile and telephones comprising an image sensor according to the invention.

BRIEF DESCRIPTION OF THE DRAWINGS

Embodiments of the invention will now be described, by way of example only, by reference to the accompanying drawings, in which.

DETAILED DESCRIPTION OF THE DRAWINGS

In any CMOS image sensor, the central element is the pixel array. There exist many publications on architectures and timing schemes to read data from the pixel. However, few of these offer information on generation or criticality of the pixel supply/control voltage levels.

Figure 1:
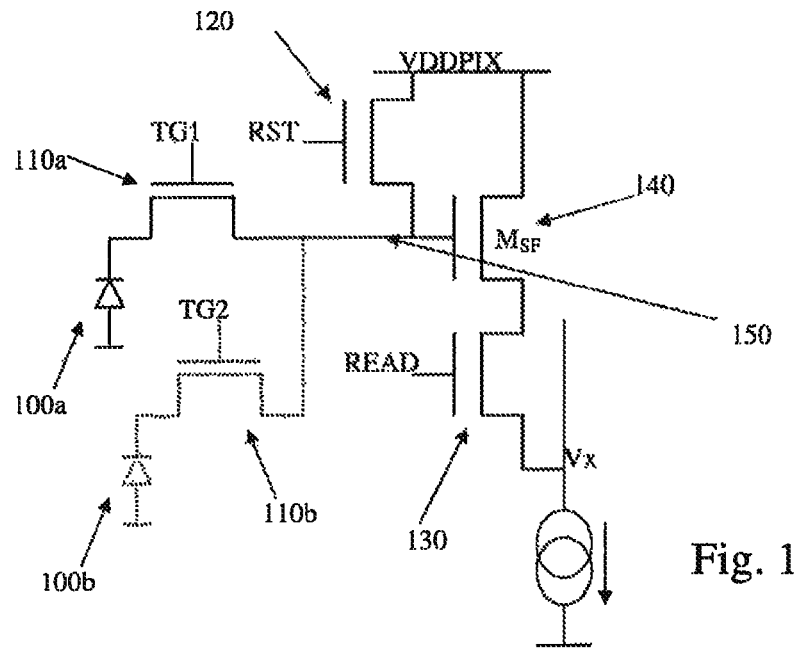
FIG. 1 is a circuit diagram of a common 4T pixel architecture.

FIG. 1 shows a common pixel architecture, based on what is known as a 4T pixel. There are four transistors 110a, 120, 130, 140 (hence 4T) and a photodiode element 100a. These transistors act to reset, expose then readout data from the structure. They comprise a transfer gate transistor 110a, controlled by signal TG, a reset transistor 120, controlled by signal RST, a readout transistor 130 controlled by signal READ and a source follower transistor 140, with gate tied to a sense node 150. They typically operate with a pinned photodiode structure and Correlated Double Sampling (CDS) to remove "kTC" noise associated with the reset operation. In Correlated Double Sampling, the output of the sensor is measured twice: once in a known condition (in this case at "black level" when the only level change is resultant from noise) and once in an unknown condition (signal level, which still includes the "black level" noise). The value measured from the known condition is then subtracted from the unknown condition so as to remove the "black level" noise offset.

To improve the area used for light collection, it is also common to share photodiode structures with the same readout. The case where two photodiode structures share a single readout is also shown in FIG. 1 (dotted, noting the extra transfer transistor 110b required for each extra photodiode 100b).

Regardless of the amount of sharing, the pixel needs to have appropriate voltage levels applied at defined time intervals. The voltage levels of the control lines TG (transfer gate, to transfer the pixel signal level to the output), RESET (to reset the pixel) and READ (to read the pixel output) as well as the pixel power supply VDDPIX, should comprise little noise, since any noise can couple directly to the sense node or column parallel output voltage level VX and corrupt the image data. This is especially important at low light levels, when the voltage swing from the pixel is small and the sensor is operating in a high analog gain.

Figure 2:
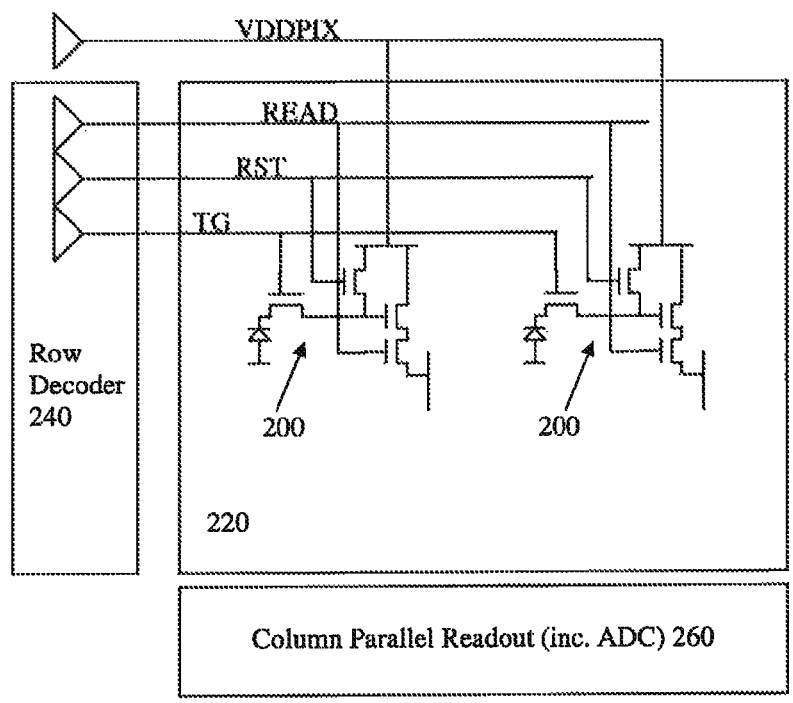
FIG. 2 is a timing diagram showing the conventional timings of a 4T pixel.

FIG. 2 shows a sensor architecture for which the concepts disclosed herein are applicable. It explicitly shows two pixels 200, forming part of a pixel array 220, and their connections to the transfer gate TG line, reset line RESET and read out line READ. These three lines are connected to row decoder 240. Also represented is the column parallel readout circuitry 260, which will include an analog to digital converter (ADC).

Figure 3:
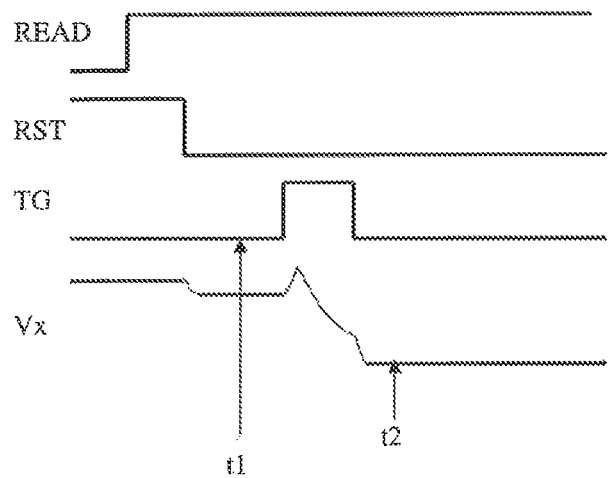
FIG. 3 shows a typical sensor architecture.

FIG. 3 is a timing diagram showing the conventional timings of a 4T pixel. It highlights the positions at which the column parallel output Vx voltage is sampled in order to perform correlated double sampling. As reset line RESET falls, there is a small drop in the level of column parallel output Vx as a result of kTC noise and variations in threshold voltage mismatch from the source follower device 140. A black level sample of column parallel output Vx is taken at time t1, after reset line RESET falls and before the transfer gate TG line is toggled. The toggling of transfer gate TG line results in column parallel output Vx rising and falling by essentially equal amounts with the rising and falling edges of the transfer gate TG line, this effect therefore cancelling out. In between these edges, when transfer gate TG line is high, the accumulated charges in the photo-sensitive element are transferred to the pixel sense node 150, causing column parallel output Vx to fall accordingly. The signal level sample can then be taken some time t2 after transfer gate TG line falls. The difference between the signal level and black level is the true signal level with noise removed.

There are numerous types of noise that can be observed in the image of a CMOS image sensor, but very generally they can be split into three groups:

Pixel Noise—variations between pixels receiving identical light conditions

Row Noise—variations common to a row of pixels

Column Noise—variations common to a column of pixels

These areas of noise can further be divided into different types of noise:

Time invariant noise

Time varying noise where the former is commonly due to process variations and device mismatch between components and the latter is the inherent noise generated in the CMOS devices.

Time invariant noise is regarded as Fixed Pattern Noise (FPN) and can appear as pixel, row or column artifacts. Time variant noise can also create pixel, row or column artifacts, although these will vary with time.

It has been observed that noise that appears common to a row or column of pixels is much more obvious to the human eye compared to noise that varies on a pixel by pixel basis. Considering time varying noise, the time varying code level of a pixel can be relatively higher before it becomes visible compared to the time varying noise associated with an entire row or column of pixels. This proposal addresses in particular the time varying noise associated with a row or column of pixels.

Figure 4:
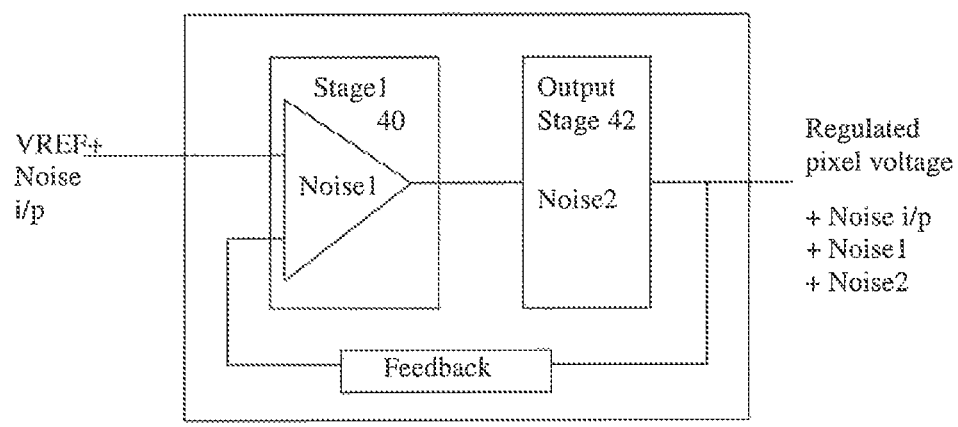
FIG. 4 shows a common regulator architecture.

FIG. 4 shows a common regulator architecture. It comprises a first stage 40 and an output stage 42, with the output of output stage 42 fed back to an input of the first stage 40 and compared to a reference voltage Vref (commonly a bandgap voltage), which feeds into another input of the first stage 40. Such a regulator can be used to provide the pixel supply in addition to the RESET, READ and TG high levels.

Reference voltage Vref is usually fixed. The correct choice of feedback can allow generation of the required voltage level for the pixel. Referring back to FIG. 3, any changes in the pixel control or supply voltages can cause a change in the pixel output voltage level. The CDS function will filter the low frequency noise components but can amplify the noise at higher frequencies.

It can be seen on FIG. 4 that the regulator output will consist of any noise on the input reference plus any noise generated in the first and output stages of the regulator. If this noise is located at a frequency above the CDS cut-off frequency, it will add to the noise of the pixel. What is worse is that since the regulated voltage connects to all pixels in a row, it will appear common to all pixels of that row and thus will be more visible to the human eye.

It is therefore proposed to use sample and hold (S/H) techniques that work in combination with the Correlated Double Sampling (CDS) technique commonly applied to CMOS image sensors to reduce or substantially eliminate the noise resultant from the pixel control voltage levels, supply voltage and column parallel output stage from the column parallel output level Vx.

Figure 5:
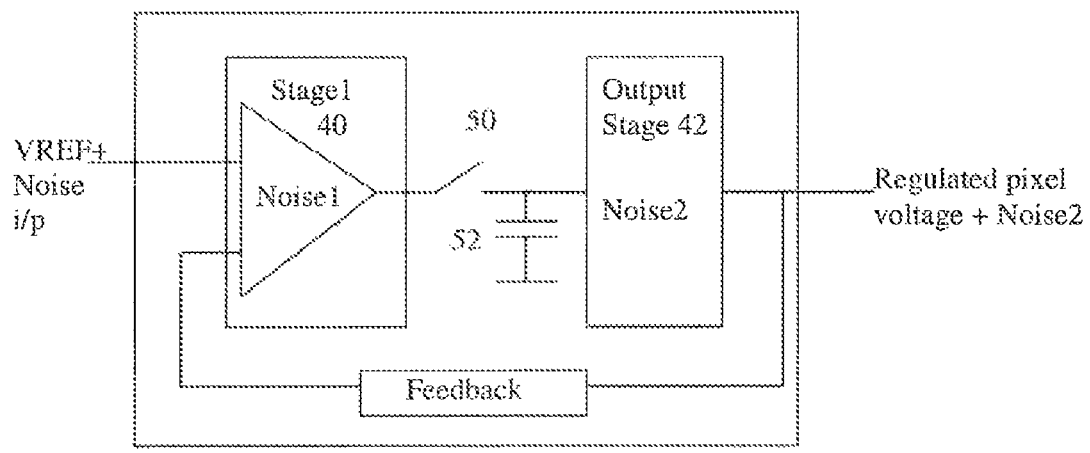
FIG. 5 shows a regulator architecture according to an embodiment of the invention.

FIG. 5 shows an arrangement of the proposed S/H scheme, where an S/H switch 50 and capacitor 52 has been placed between the first and output stages of the regulator. When the switch 50 is opened, the noise of the preceding stages will be sampled at the input of the output stage. Therefore this sampled voltage level will appear on the pixel column parallel output Vx as a time invariant noise level, which will effectively be added to the sampled black level noise, and will be removed by the CDS along with the black level noise from other sources.

With the particular arrangement of FIG. 5 the only time varying noise on the column parallel output Vx will be due to the output stage of the regulator. Consequently the time varying row noise of the image sensor is reduced and image quality improved. As a further consequence, specifications in terms of noise can be relaxed for the preceding stages of the regulator.

This switch 50 could similarly be placed at the input of the regulator or in some cases between the output of the regulator and the pixel array. In each case, only the noise sources before the switch will be sampled and therefore be made time invariant and compensated for. While this means that putting the switch at the output of the regulator should, in theory, be best as it samples the noise from the regulator output stage, in practice problems of ground bounce (time variant) make this a less desirable option. It should also be appreciated that such a design relies on the pixel and readout circuitry to reject small variations in the common mode voltage output of the regulator.

Figure 6:
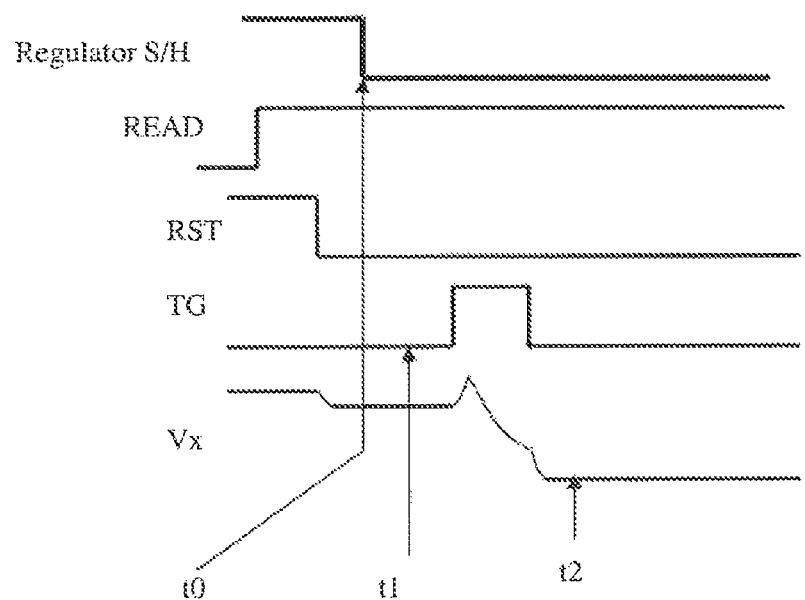
FIG. 6 shows the control timing for a pixel forming part of an image sensor according to an embodiment of the invention.

FIG. 6 shows the control timing of such a S/H switch in relation to the pixel timings. The switch is opened before the black level is sampled from the pixel at time t0. In this case the sampled noise of the regulator is common to both the black and signal samples and is thus cancelled. Only the noise of the output stage of the regulator can vary between the black t1 and signal t2 samples.

Figure 7:
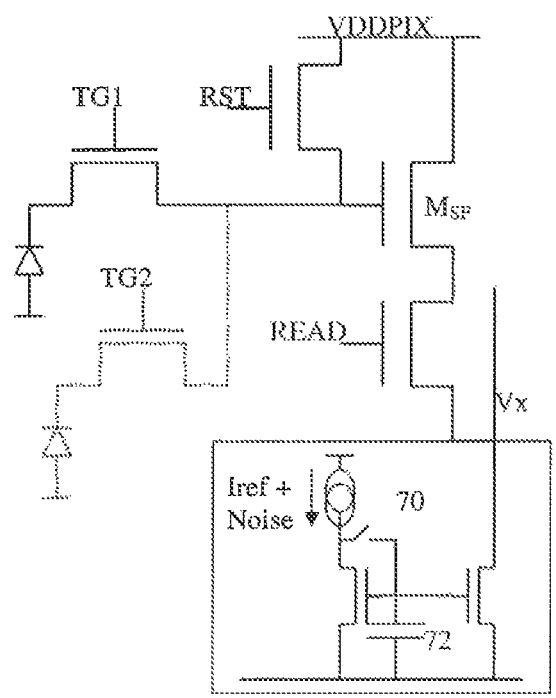
FIG. 7 shows a column current source according to a further embodiment of the invention.

FIG. 7 shows a further embodiment of the invention. It shows a column current source with a S/H hold switch 70 and capacitor 72 added. It is feasible that the capacitor 52 be dispensed with and the current mirror's readout leg transistor could provide the necessary capacitance for holding the sampled level.

Normally, as with the regulator described above, the column current source that connects to the output of the selected source follower can also create noise in an image associated with all pixels in a particular row. Dependent on the noise of the reference current used to bias the current source, noise in the column can be reduced by performing a S/H on the gate of the current generating device. The timing is the same as that for the regulator S/H, as shown in FIG. 6, where the S/H switch opens before the black sample is performed on the black level data from the pixel.

It should be appreciated that the sensor of the present invention does not necessarily need correlated double sampling performed on its output signals, but can have the noise cancelled in other ways. One such suitable method is to use the continuous time analog to digital converter (ADC) architecture as disclosed in EP1956715, EP2104234 or U.S. application Ser. No. 12/622,373, all of which are incorporated herein by reference.

This arrangement was devised to mitigate sample and hold noise caused by sample and hold capacitors of a correlated double sample circuit, more commonly known as kT/C noise. This kT/C noise means that to halve the noise, capacitor size is required to increase fourfold. As such, size or noise limits are placed on the design of the image sensor. Using a continuous time arrangement, the kT/C noise of the sample capacitors, C1 and C2, is mitigated by removing the requirement to hold. That is, the capacitors C1 and C2 are continuously connected to the ramp generator and VX respectively and, as such, there is a less kT/C noise generated than if a hold operation was performed. This allows capacitors C1 and C2 to be reduced in size.

In such a continuous time sensor ADC arrangement, the image sensor has a per-column ADC including first and second capacitors. The capacitors are continuously connected to, respectively, the analog pixel signal and a ramp signal without use of a hold operation.

Figure 8:
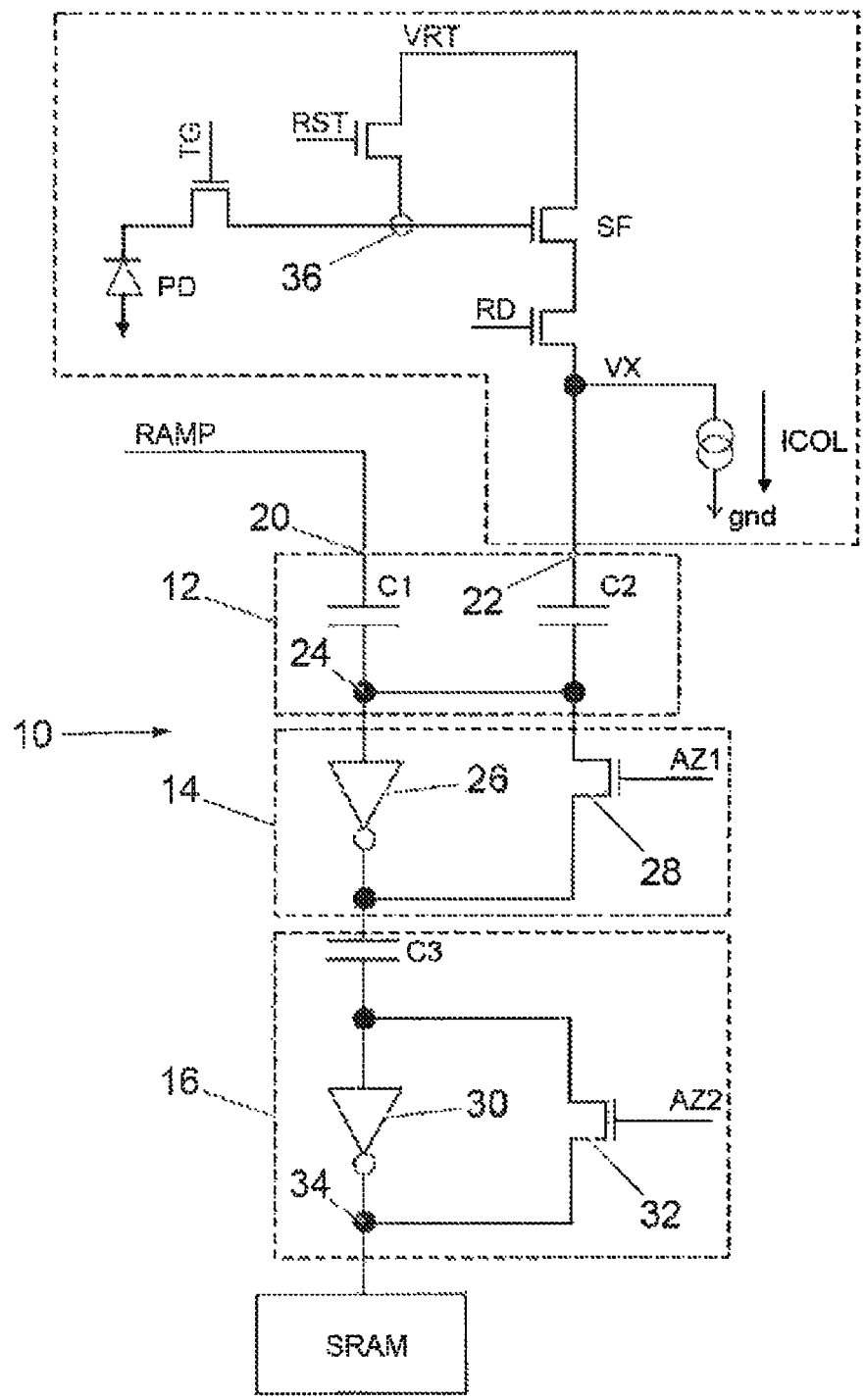
FIG. 8 shows a continuous time ADC architecture for use in combination with embodiments of the invention.

FIG. 8 shows an example of such an analog to digital converter ADC 10, which comprises an input circuit 12 and a comparator, the comparator comprises an inverter circuit 14 and an output circuit 16. The input 22 to the input circuit 12 is from the column output line of a pixel array, one pixel 18 being shown by way of example.

The input circuit 12 comprises a first capacitor C1 connected to a first input 20 and a second capacitor C2 connected to a second input 22. The first input 20 is connected to a ramp generator, which generates an appropriate time varying reference signal RAMP when required by the control means. The value of the time varying reference signal being known by the control means at any given time. The second input 22 is connected to the output of the pixel 18. The first and second capacitors C1, C2 are also connected to the input circuit's output node 24. The input circuit 12 obtains results similar to correlated double sampling by zeroing the black pixel value.

The inverter circuit 14, comprises a first inverter 26 and, on a feedback loop from the output of the first inverter 26, a first transistor 28. The first transistor 28, in this instance, operates as a switch and is activated by an autozero signal AZ1 from the control means.

The output circuit 16 comprises a third capacitor C3, connected to the output of the inverter circuit 14, a second inverter 30 and, on a feedback loop from the output of the second inverter 30, a second transistor 32. The second transistor 32, in this instance, operates as a switch and is activated by an autozero signal AZ2 from the control means. The output circuit 16 stores the value of the pixel 18 in a memory SRAM.

The comparator (inverter circuit 14 and an output circuit 16) can be described as a summing comparator, in that it adds the two input values RAMP and VX. If RAMP+VX is greater than zero, the output of the comparator goes high, and, if RAMP+VX is less than zero, the output of the comparator goes low, where zero for RAMP is the value of RAMP when VX(black) is measured and zero for VX is VX(black).

The above embodiments are described by way of example only, and there are many different embodiment and variations which may be envisaged that fall within the spirit and scope of the invention. For example, the above techniques may be implemented wherever a reference voltage/current or bias voltage or current is required, so as to compensate for the noise inherent in the reference/bias voltage or current. This could include implementing S/H circuitry (e.g. a switch and possible a capacitor) at output of any bandgap circuit (when supplying a reference/bias voltage) or within the bandgap circuit (when supplying a reference/bias current). Equally, any power supplies, such as pixel power supply VDDPIX could also be provided with S/H circuitry provided that there is a current path for the supply to provide current as is necessary for its function. Furthermore a S/H switch may be implemented in the column's analog to digital circuitry (ADC) for noise reduction resultant from the ADC amplifier.

What is claimed is:

1. An image sensor comprising:
    an array of pixels, each pixel having at least one photo-sensitive element,
    readout circuitry operable to receive an analog signal from each pixel at a first time and at a second time, the signal level between said first and second times varying in dependence with the light sensed by said photo-sensitive element, said signal level at said first and second times including pixel noise; and
    a voltage regulator circuit including:
        an input stage configured to receive a reference signal and a feedback signal and generate a control voltage;
        a sample and hold circuit configured to sample and hold the control voltage during a time period starting before said first time and ending after said second time; and
        an output stage configured to generate the feedback signal and further configured to generate, in response to the sampled and held control voltage, a regulated output voltage for application as a supply voltage to the array of pixels and readout circuitry.

2. The image sensor as claimed in claim 1 wherein said sample and hold circuit comprises at least one switch coupled in series between an output of the input stage and an input of the output stage, said at least one switch controlled to an open position during said time period.

3. The image sensor as claimed in claim 1 further comprising a bandgap circuit configured to generate said reference signal.

4. The image sensor as claimed in claim 1 operable such that correlated double sampling is performed on said analog signal, said double sampling being performed at said first and second times respectively.

5. The image sensor as claimed in claim 1 wherein the readout circuitry comprises a continuous time architecture comprising:
    an input circuit comprising a first input for receiving said analog signal and a second input for receiving a time variant reference signal, and two coupling capacitors; and
    a comparator circuit that compares the time variant reference signal and the analog signal;
    wherein the analog signal from the pixel and the time variant reference signal are constantly read onto one of the two coupling capacitors respectively of the input circuit between said first time and said second time.

6. The image sensor of claim 1 wherein the image sensor is provided within one of a camera module, a camera, or a mobile telephone.

7. The image sensor as claimed in claim 2 wherein said sample and hold circuit comprises a sampling capacitor coupled between said switch and the input of the output stage and configured to store said control voltage at a fixed value during said time period.

8. The image sensor as claimed in claim 5 wherein the sensor is operable such that the threshold of said comparator circuit is dependent on the analog signal at said first time, said readout circuit being operable, at said second time, to perform an analog to digital conversion to obtain a digital value corresponding to the change in said analog signal level between said first time and said second time.

9. An image sensor comprising:
    an array of pixels, each pixel having at least one photo-sensitive element,
    readout circuitry operable to receive an analog signal from each pixel at a first time and at a second time, the signal level between said first and second times varying in dependence with the light sensed by said photo-sensitive element, said signal level at said first and second times including pixel noise; and
    a current source circuit configured to provide a bias current to a column output line of the array of pixels that is dependent on a voltage, the current source circuit comprising: a sample and hold circuit configured to sample and hold the voltage during a time period starting before said first time and ending after said second time.

10. The image sensor as claimed in claim 9 wherein said current source circuit comprises a current reference and two transistors arranged as a current mirror, and wherein said sample and hold circuit comprises at least one switch coupled between an output of the current reference output and a common control electrode of the two transistors in the current mirror.

11. The image sensor as claimed in claim 9 wherein the current source circuit comprises a bandgap circuit operable to provide the bias.

12. The image sensor as claimed in claim 9 operable such that correlated double sampling is performed on said analog signal, said double sampling being performed at said first and second times respectively.

13. The image sensor as claimed in claim 9 wherein the readout circuitry comprises a continuous time architecture comprising:

an input circuit comprising a first input for receiving said analog signal and a second input for receiving a time variant reference signal, and two coupling capacitors; and a comparator circuit that compares the time variant reference signal and the analog signal;

wherein the analog signal from the pixel and the time variant reference signal are constantly read onto one of the two coupling capacitors respectively of the input circuit between said first time and said second time.

14. The image sensor of claim 9 wherein the image sensor is provided within one of a camera module, a camera, or a mobile telephone.

15. The image sensor as claimed in claim 9, wherein said current source circuit comprises a transistor coupled to the column output line and having a control terminal, and wherein said sample and hold circuit provides the sampled and held voltage to the control terminal of the transistor.

16. The image sensor as claimed claim 10 wherein the sample and hold circuit further comprises a capacitor coupled between the common control node and a reference supply node.

17. The image sensor as claimed in claim 13 wherein the sensor is operable such that the threshold of said comparator circuit is dependent on the analog signal at said first time, said readout circuit being operable, at said second time, to perform an analog to digital conversion to obtain a digital value corresponding to the change in said analog signal level between said first time and said second time.

18. An image sensor comprising:
an array of pixels, each pixel having at least one photosensitive element;
readout circuitry operable to perform correlated double sampling of an analog signal output from each pixel comprising a measurement of black level pixel noise at a first time followed by a measurement of a pixel image signal at a second time; and
a voltage regulator circuit including:
an input stage configured to receive a reference signal and a feedback signal and generate a control voltage;
a sample and hold circuit configured to sample and hold the control voltage during a time period starting before said first time and ending after said second time; and
an output stage configured to generate the feedback signal and further configured to generate, in response to the sampled and held control voltage, a regulated output voltage for application as a supply voltage to the array of pixels and readout circuitry.

19. An image sensor comprising:
an array of pixels, each pixel having at least one photosensitive element;
readout circuitry operable to perform correlated double sampling of an analog signal output from each pixel comprising a measurement of black level pixel noise at a first time followed by a measurement of a pixel image signal at a second time; and
a current source circuit configured to provide a bias current to a column output line of the readout circuit, said bias current dependent on a voltage, the current source circuit comprising: a sample and hold circuit configured to sample and hold the voltage during a time period starting before said first time and ending after said second time.

20. The sensor of claim 19, wherein the current source circuit comprises a transistor having a source-drain path coupled in series with the column output line, said transistor having a gate terminal to which the sampled and held voltage is applied.

* * * * *